(12) United States Patent
Lush

(10) Patent No.: US 8,663,347 B2
(45) Date of Patent: Mar. 4, 2014

(54) FIRE LOG

(76) Inventor: Raymon W. Lush, Bloomfield, NE (US)

(*) Notice: Subject to any disclaimer, the term of this patent is extended or adjusted under 35 U.S.C. 154(b) by 355 days.

(21) Appl. No.: 13/200,412

(22) Filed: Sep. 23, 2011

(65) Prior Publication Data

US 2012/0090227 A1 Apr. 19, 2012

Related U.S. Application Data

(60) Provisional application No. 61/455,041, filed on Oct. 14, 2010.

(51) Int. Cl.
*C10L 11/00* (2006.01)
(52) U.S. Cl.
USPC .......................................................... 44/535
(58) Field of Classification Search
USPC .......................................................... 44/535
See application file for complete search history.

(56) References Cited

U.S. PATENT DOCUMENTS

| 3,635,684 A * | 1/1972 | Seymour ........................ 44/576 |
| 2008/0216396 A1 * | 9/2008 | Bier .............................. 44/554 |

* cited by examiner

*Primary Examiner* — Cephia D Toomer
(74) *Attorney, Agent, or Firm* — Dennis L. Thomte; Thomte Patent Law Office LLC

(57) ABSTRACT

A fire log is provided which is comprised of a mixture of ground mature sweet corn kernels and water. A second embodiment is disclosed wherein the fire log is comprised of ground mature sweet corn kernels, chopped or ground corn cobs and water. A third embodiment is disclosed wherein the fire log is comprised of ground mature sweet corn kernels, chopped or ground sweet corn cobs and chopped or ground sweet corn stalks mixed with water. A fourth embodiment of the fire log is disclosed wherein the fire log is comprised of ground mature sweet corn kernels, water and conventional combustible petroleum materials such as used in conventional fire logs. The mixture is pressed, formed or extruded to form cylindrical fire logs or block fire logs.

16 Claims, 1 Drawing Sheet

FIRE LOG

CROSS-REFERENCE TO RELATED APPLICATION

This application claims the benefit of Provisional Application Ser. No. 61/455,041, filed on Oct. 14, 2010, entitled FIRE LOG.

BACKGROUND OF THE INVENTION

1. Field of the Invention

This invention relates to a fire log and more particularly to a fire log which is comprised of ground mature sweet corn kernels and water. Further, in another embodiment the fire log is comprised of ground mature sweet corn kernels, corn cobs and water. In a further embodiment, the fire log is comprised of ground mature sweet corn kernels, ground corn cobs, ground corn stalks and water. In a further embodiment, the fire log is comprised of ground mature sweet corn, water and conventional combustible petroleum materials normally used in fire logs.

2. Description of the Related Art

Many types of prior art synthetic or artificial fire logs have been previously provided. The prior art fire logs are normally comprised of wood particles mixed with combustible waxes and then pressed into cylindrical or block forms. The use of combustible materials in the fire logs may present smoke problems and could possibly involve health problems.

SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

A fire log is described which is comprised of ground mature sweet corn kernels and water. A second embodiment of the fire log invention comprises ground mature sweet corn and ground corn cobs mixed with water. In a further embodiment of the invention, the fire log is comprised of ground mature sweet corn, ground corn cobs and ground corn stalks mixed with water.

The fire log is preferably pressed by any convenient means into cylindrical logs or quadrilateral-shaped logs which may be square or rectangular in cross section. The fire log may also be formed by extrusion methods such as cold extrusion.

It is therefore a principal object of the invention to provide an improved fire log.

A further object of the invention is to provide an improved fire log which is comprised of ground mature sweet corn kernels and water.

A further object of the invention is to provide a fire log which is comprised of ground mature sweet corn kernels, ground corn cobs and water.

A further object of the invention is to provide a fire log comprised of ground mature sweet corn kernels, ground corn cobs, ground corn stalks and water.

A further object of the invention is to provide a fire log comprised of ground mature sweet corn kernels, water and conventional combustible petroleum products.

These and other objects will be apparent to those skilled in the art.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DESCRIPTION OF THE PREFERRED EMBODIMENT

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

Figure 1:
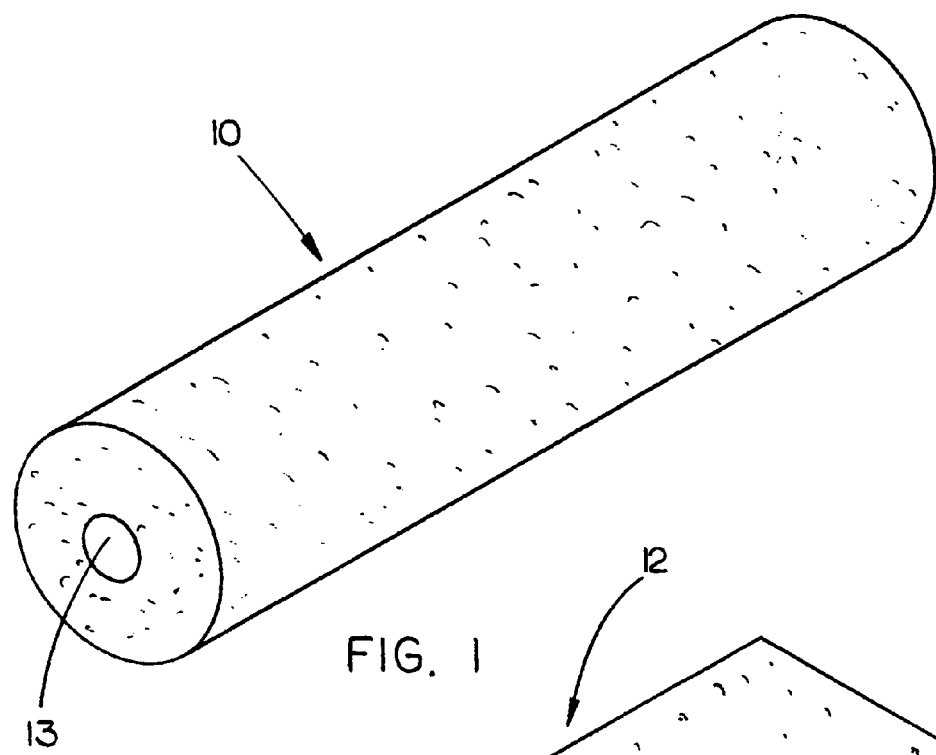
FIG. 1 is a perspective view of a cylindrical fire log of this invention.
Figure 2:
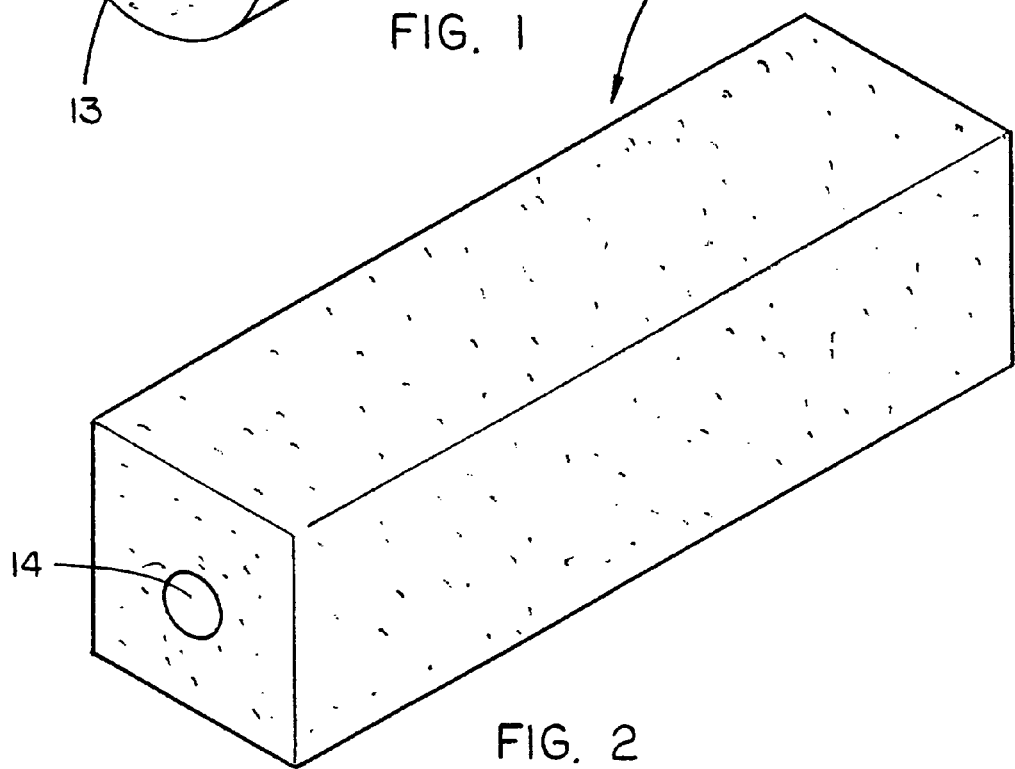
FIG. 2 is a perspective view of a square fire log of this invention.

The fire log of this invention is shown in cylindrical form in FIG. 1 and is designated by the reference numeral 10 while the quadrilateral-shaped fire log is designated by the reference numeral 12 in FIG. 2. Fire log 10 may or may not have a cylindrical hole or bore 13 extending therethrough. Fire log 12 may or may not have a cylindrical hole or bore 14 extending therethrough.

In the preferred embodiment, the fire log is comprised of 80-95%, by weight, ground mature sweet corn kernels and 5-20%, by weight, water. In the preferred embodiment, the mature sweet corn kernels preferably comprise 90%, by weight, of the fire log with water comprising 10%, by weight, of the fire log. The ground mature sweet corn kernels are mixed with water with the starch of the ground sweet kernels forming a binding or bonding agent. The mixture is then pressed into either a cylindrical shape as illustrated in FIG. 1 or into the block form illustrated in FIG. 2.

In a second embodiment of the invention, the fire log is comprised of ground mature sweet corn kernels and chopped or ground corn cobs mixed with water. In the second embodiment, the preferred range of ingredients is 80-95%, by weight, ground mature sweet corn kernels and chopped or ground corn cobs and 5-20%, by weight, water. In the second embodiment, the preferred percentage is 90%, by weight, ground mature sweet corn kernels and chopped or ground corn cobs and 10%, by weight, water. In the second embodiment, the ingredients are mixed and then pressed into the cylindrical form of FIG. 1 or into the block form of FIG. 2.

A third embodiment of the fire log is also disclosed wherein the fire log is comprised of ground mature sweet corn kernels, chopped or ground corn cobs and chopped or ground corn stalks mixed with water. In the third embodiment, the preferred range of ingredients is 80-95%, by weight, ground mature sweet corn kernels, chopped or ground corn cobs and chopped or ground corn stalks and 5-20%, by weight, water. In the third embodiment, the preferred percentage of the ingredients is 90%, by weight, ground mature sweet corn kernels, chopped or ground corn cobs and chopped or ground corn stalks and 10%, by weight, water. The third embodiment is also pressed into a cylindrical shape or block shape illustrated in the drawings.

Although it is preferred that the fire logs of this invention not contain combustible petroleum products, a fourth embodiment of the fire log is disclosed. In the fourth embodiment, the fire log is comprised of ground mature sweet corn kernels, water and conventional combustible petroleum materials such as used in conventional fire logs. In the fourth embodiment, the preferred range of ingredients is 15 to 30%, by weight, ground mature sweet corn kernels, 10%, by weight, water mixed with conventional combustible ingredients that are being used in present fire logs such as wax, etc.

The fire logs of this invention are bound together through the interaction of the starches of the sweet corn to bind the ingredients together so that they may be pressed or formed into the desired shape for burning in a fire place or the like.

Although the invention described herein is primarily designed to produce fire logs, the pressing apparatus may be used to produce products such as disclosed in Applicant's pending applications Ser. No. 12/802,344 entitled WILD BIRD FEED AND METHOD OF MAKING SAME, filed Jun. 4, 2010 and Applicant's pending application Ser. No. 12/802,374 entitled POULTRY FEED AND METHOD OF MAKING SAME, filed Jun. 4, 2010, the disclosures of which are incorporated herein by reference thereto.

Further, although the logs or blocks are described as being formed by pressure, the logs or blocks could be formed by extrusion methods such as cold extrusion.

It can therefore be seen that the invention accomplishes at least all of its stated objectives.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

I claim:

1. A fire log comprised of 80-95% by weight ground mature sweet corn kernels and 5-20% by weight water.

2. The fire log of claim 1. wherein said ground mature sweet corn kernels comprise 90%, by weight, of the fire log and wherein said water comprises 10%, by weight, of the fire log.

3. The fire log of claim 1 wherein the ground mature sweet corn kernels and water are mixed and pressed into a quadrilateral block or a cylindrical block.

4. A fire log comprising 80-95%, by weight, ground mature sweet corn kernels and chopped or ground corn cobs and 5-20%, by weight, water.

5. The fire log of claim 4 wherein the ground mature sweet corn kernels and chopped or ground corn cobs comprises 90%, by weight, of the fire log and wherein the water comprises 10%, by weight, of the fire log.

6. The fire log of claim 4 wherein the ground mature sweet corn kernels, chopped or ground corn cobs and water are mixed and pressed into a quadrilateral block or cylindrical block.

7. A fire log comprising 80-95%, by weight, ground mature sweet corn kernels, chopped or ground corn cobs and chopped or ground corn stalks and 5-20%, by weight, water.

8. The fire log of claim 7 wherein the ground mature sweet corn kernels, chopped or ground corn cobs and chopped or ground corn stalks comprise 90%, by weight, and the water comprises 10%, by weight.

9. The fire log of claim 7 wherein the ground mature sweet corn kernels, chopped or ground corn cobs and chopped or ground corn stalks are pressed into a quadrilateral block or cylindrical block.

10. A fire log comprising 15-30%, by weight, ground mature sweet corn kernels, 10%, by weight, water and conventional combustible materials.

11. The fire log of claim 3 wherein the blocks have an elongated cylindrical bore extending therethrough.

12. The fire log of claim 6 wherein the blocks have an elongated cylindrical bore extending therethrough.

13. The fire log of claim 9 wherein the blocks have an elongated cylindrical bore extending therethrough.

14. The fire log of claim 1 wherein the ground mature sweet corn kernels and water are mixed and extruded to form a quadrilateral block or a cylindrical block.

15. The fire log of claim 4 wherein the ground mature sweet corn kernels, chopped or ground corn cobs and water are mixed and extruded to form a quadrilateral block or cylindrical block.

16. The fire log of claim 7 wherein the ground mature sweet corn kernels, chopped or ground corn cobs and chopped or ground corn stalks are extruded to form a quadrilateral block or cylindrical block.

* * * * *